US007146433B2

(12) United States Patent
Cromer et al.

(10) Patent No.: US 7,146,433 B2
(45) Date of Patent: Dec. 5, 2006

(54) EXTENDING AN ALLOWABLE TRANSMISSION DISTANCE BETWEEN A WIRELESS DEVICE AND AN ACCESS POINT BY COMMUNICATION WITH INTERMEDIATE WIRELESS DEVICES

(75) Inventors: Daryl Carvis Cromer, Apex, NC (US); Howard Jeffrey Locker, Cary, NC (US); Andy Lloyd Trotter, Raleigh, NC (US); James Peter Ward, Raleigh, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 692 days.

(21) Appl. No.: 10/061,479

(22) Filed: Feb. 1, 2002

(65) Prior Publication Data
US 2003/0156558 A1 Aug. 21, 2003

(51) Int. Cl.
*G06F 15/173* (2006.01)
*H04B 7/15* (2006.01)

(52) U.S. Cl. ............... 709/239; 709/217; 709/238; 709/241; 370/235; 370/236; 370/237; 370/238; 455/11.1; 455/464

(58) Field of Classification Search ............... 709/217, 709/238, 239, 241; 455/11.1, 464; 370/235–238
See application file for complete search history.

(56) References Cited

U.S. PATENT DOCUMENTS

| 5,152,002 A * | 9/1992 | Leslie et al. ............. 455/422.1 |
| 5,481,539 A | 1/1996 | Hershey et al. ............ 370/85.3 |
| 5,621,798 A | 4/1997 | Aucsmith ................... 380/271 |
| 5,757,783 A | 5/1998 | Eng et al. ................... 370/315 |
| 5,790,938 A | 8/1998 | Talarmo ..................... 455/11.1 |
| 5,850,593 A | 12/1998 | Uratani ...................... 455/11.1 |
| 5,884,031 A | 3/1999 | Ice |
| 5,890,054 A | 3/1999 | Logsdon et al. ............ 455/11.1 |
| 5,901,362 A | 5/1999 | Cheung et al. ............ 455/525 |
| 6,055,561 A * | 4/2000 | Feldman et al. ............ 709/200 |
| 6,141,533 A * | 10/2000 | Wilson et al. ............. 455/11.1 |
| 6,188,681 B1 | 2/2001 | Vesuna |
| 6,243,573 B1 * | 6/2001 | Jacklin ....................... 455/416 |
| 6,249,810 B1 | 6/2001 | Kiraly |
| 6,377,805 B1 | 4/2002 | Anvekar et al. ............ 455/436 |

(Continued)

FOREIGN PATENT DOCUMENTS

JP 2000-151497 5/2000

(Continued)

OTHER PUBLICATIONS

Regis j. "Bud" Bates and Donald W. Gregory, Voice and Data Communications Handbook, Fourth Edition, Osborne/McGraw-Hill, 2001, pp. 603-610.

(Continued)

*Primary Examiner*—Zarni Maung
*Assistant Examiner*—V. Korobov
(74) *Attorney, Agent, or Firm*—Carlos Munoz-Bustamant

(57) ABSTRACT

A remote mobile unit (MU) including a radio device is provided with an ability to communicate through a LAN by remote association with an access point (AP) that is out of range for communication with the radio device of the remote MU. The remote MU transmits a quest frames that is received and retransmitted by one or more intermediate MUs until a connection is made with the AP. Each of the intermediate MUs adds an identifying address to the request, forming a path that is used in both directions to transmit a response from the AP to the remote MU and to transmit data between the AP and the MU.

16 Claims, 10 Drawing Sheets

U.S. PATENT DOCUMENTS

| | | | |
|---|---|---|---|
| 6,414,955 B1 | 7/2002 | Clare et al. | 370/390 |
| 6,459,881 B1 | 10/2002 | Hoder et al. | 455/11.1 |
| 6,473,617 B1 | 10/2002 | Larsen et al. | 455/446 |
| 6,546,425 B1* | 4/2003 | Hanson et al. | 709/227 |
| 6,590,928 B1* | 7/2003 | Haartsen | 375/134 |
| 6,782,422 B1* | 8/2004 | Bahl et al. | 709/224 |
| 2001/0036810 A1 | 11/2001 | Larsen | 455/11.1 |
| 2002/0045435 A1* | 4/2002 | Fantaske | 455/403 |
| 2002/0072329 A1 | 6/2002 | Bandeira et al. | 455/7 |
| 2002/0093956 A1 | 7/2002 | Gurin | 370/389 |
| 2002/0146981 A1* | 10/2002 | Saint-Hilaire et al. | 455/41 |
| 2003/0045296 A1* | 3/2003 | Burr | 455/445 |

FOREIGN PATENT DOCUMENTS

| | | |
|---|---|---|
| JP | 2000-0151497 | 5/2000 |
| WO | WO 88/09969 | 12/1988 |
| WO | WO 00/64106 | 10/2000 |

OTHER PUBLICATIONS

Peter Norton and Dave Kearns, Peter Norton's Complete Guide to Networking, Sams/Macmillan, 1999, pp. 60-62, 67.

Jeffrey Wheat, Randy Hiser, Jackie Tucker, Alicia Neely, and Andy Mcullough, Designing a Wireless Network, Syngress, Rockland, MA, 2001, pp. 128-143, 254.

Carl Zacker, Networking: The Complete Reference, Osborne/McGraw-Hill, 2001, pp. 108-124.

"Packet Relay System for Wireless LAN" IBM Technical Disclosure Bulletin, vol. 39, No. 2, Feb. 1996, pp. 135-135.

Bowman, R.D. et al; "Channel Access for Simultaneous Voice and Data Transmissions in a Multiple Hop Packet Radio Network," Military Communications Conference, 1998, MILCOM 98. Proceedings., IEEE, vol. 1, Oct. 18-21, 1998, pp. 193-197.

Bowman, R.D., et al; "Route Selection for Data Packets in a Tactical Packet Radio Network Using Integrated Voice and Data Transmissions," Military Communications Conference, 1999, MILCOM 1999. IEEE, vol. 2, Oct. 31-Nov.3, 1999, pp. 756-760.

"Packet Relay System for Wireless LAN" IBM Technical Disclosure Bulletin, vol. 39, No. 2, Feb. 1996 pp. 133-135.

F. Gfeller, "Infrared Microbroadcasting Network for In-House Data Communication" IBM Technical Disclosure Bulletin vol. 24, No. 8 Jan. 1982, pp. 4043-4046.

A.R. Wheeler, et al. Physical Layer Repeater for Infrared Cableless Local Area Network, IBM Technical Disclosure. Bulletin vol. 29, No. 9 Fev 1987 pp. 4205-4206.

R.D. Bowman et al. "Channel Access for Simultaneous Voice and Data Transmissions in a Multiple Hop Packet Radio Network".

Military Communications Conference, 1998, MILCOM 98 Proceedings, IEEE vol. 1, Oct. 18-21, 1998 pp. 193-197.

R.D. Bowman et al. "Route Selection for Data Packets in a Tactical Packet Radio Network using Integrated Voice and Data Transmissions".

Military Communications Conference, 1999, MILCOM 99 IEEE vol. 2 Oct. 31-Nov. 3, 1999, pp. 756-760.

Clark, G.L. et al, "Physical Layer Repeater for Infrared Cableless Local Area Network," Technical Disclosure Bulletin, Feb. 1987, pp. 4205-4206.

Gfeller, G., "Infrared Microbroadasting Network for In-House Data Communication," Technical Disclosure Bulletin, Jan. 1982, pp. 4043-4046.

* cited by examiner

EXTENDING AN ALLOWABLE TRANSMISSION DISTANCE BETWEEN A WIRELESS DEVICE AND AN ACCESS POINT BY COMMUNICATION WITH INTERMEDIATE WIRELESS DEVICES

BACKGROUND INFORMATION

1. Field of the Invention

This invention relates to a wireless local area network, and, more particularly, to a wireless local area network including a stationary access point and a plurality of mobile wireless devices, in which it is desirable to increase the maximum allowable distance for transmission between the stationary access point and one or more of the mobile wireless devices.

2. Summary of the Background Art

In a number of locations, a wireless local area network (WLAN) is used to provide one or more wireless mobile units (MUs), such as portable computing systems having short-range radio transmission capabilities, with an ability to connect to a conventional wired local area network (LAN) through a stationary access point (AP) connected to the LAN. In particular, increasing numbers of such WLANs are built with devices conforming to the IEEE 802.11 standard, which provides the MUs with abilities to connect to one another, to move around within an area of coverage allowing communication with a single AP, and to seamlessly move from a area in which a connection is made with one AP to an area in which a connection is made with another AP.

FIG. 1 is a block diagram of a number of MUs 10 connected to form a conventional ad-hoc network 12 in accordance with the IEEE 802.11 standard. All of the MUs 10 are connected directly to one another by radio links 14. Since no AP is present within the ad-hoc network 12, the MUs 10 can only communicate with one another, and therefore form an independent basic service set (BSS). There is no way to communicate with the rest of the world. Such a network 12 is formed when a number of individuals, wishing to share data and having MUs operating according to the IEEE 802.11 standard, meet in a location, such as a conference room, in the absence of an AP. The ad-hoc network 12 may be formed in an automatic fashion as the operating MUs 10 are brought close enough to one another to begin communications while determining that an AP is not present.

FIG. 2 is a block diagram of a number of MUs 10 connected to form a pair of conventional infrastructure basic service sets (BSSs) 16, 17 also in accordance with the IEEE 802.11 standard, which defines media access control (MAC) layer and physical (PHY) layer specifications for a wireless LAN. The first infrastructure BSS 16 includes an AP 18, which is connected by wires to a conventional wired LAN 20. The second infrastructure BSS 17 includes an AP 19, which is also connected by wires to the LAN 20. Each infrastructure BSS 16, 17 is limited to a number of MUs 10 that are in range for communication with the AP 18, 19. Within each infrastructure BSS 16, 17 each operating MU 10 is connected directly to the AP 18 by means of a radio link 22; the MUs 10 are not connected directly to one another. An individual MU 10 can use this system to communicate with another MU 10 in the same infrastructure BSS 16, with an MU 10 in another infrastructure BSS 17 connected to the LAN 20, or for various purposes conventionally achieved through connection to a LAN, such as obtaining access to the Internet.

For a message to be transmitted to or from an MU 10 within a BSS 16, the MU 10 must be associated with the AP 18 within the BSS 16. The process of association, which synchronizes the MU 10 with the AP 18 for communication, is begun by the MU 10 using an association service of the AP 18. According to the IEEE 802.11 standard, the MU 10 begins the association process by scanning to determine which APs 18 can be reached from the location of the MU 10 and by requesting association with a single AP 18. The MU 10 may use a passive scanning process, monitoring beacon frames transmitted by the APs 18 to determine which AP 18 is close enough for communications. Alternately, the MU 10 may use an active scanning process, transmitting probe frames. An AP 18 close enough to receive the probe frames then transmits probe response frames if certain criteria are met by the probe frames.

An important feature of the deployment of WLANs according to the IEEE 802.11 standard is the provision for an extended service set (ESS) architecture, in which a number of APs 18, 19 communicate with one another to forward data traffic from one BSS 16 to another BSS 17, and to switch a roaming MU 10 from one BSS 16 to another BSS 17. These switching functions are performed by the distribution system (DS), serving as the spine of the WLAN.

In a WLAN operating according to IEEE 802.11, the AP 18 provides an authentication service, which, in defining the identity of a particular MU 10, can be used to determine whether the MU 10 is allowed access to the LAN 20 by comparing the Media Access Control (MAC) address of the MU 10 with a list of acceptable addresses stored within the AP 18 or at another location accessible through the LAN 20. The MAC address is a hardware-level machine address code given to the MU 10 or to a circuit element within the MU 10 at its time of manufacture. Every MAC address is unique, so no two MUs can have the same MAC address. For example, if the MU 10 is a portable personal computer communicating through a network interface card (NIC) built in a PC Card format for establishing wireless communications a MAC address stored in non-volatile storage within the NIC at its time of manufacture is the MAC address of the MU 10.

To facilitate operation within the BSS architecture, the MU 10 may cause itself to be authenticated with additional APs 18 in adjacent BSSs 16. While an MU 10 can be associated with only one AP 18 at a time, it can be authenticated by a number of APs 18, 19. In order to free resources of the AP 18 for use with other MUs 10, the AP 18 also performs a de-authentication service, eliminating a previously known station identity, when the MU 10 shuts down or when it roams out of the range of the AP 18.

The AP 18 can also perform a disassociation service, eliminating its association with the MU 10 when the MU 10 roams out of range, when the AP 18 is shutting down, or for a number of other reasons. When this occurs, the MU 10 must use the association service of the WLAN to connect to another AP 19.

A particularly important feature of a WLAN built in accordance with the IEEE 802.11 standard is the ability given the user of an MU 10 to roam from one BSS to another, for example, within an office building, within a home, or on a college campus, without a need to modify network services. In an environment built to provide for such roaming, the overlapping area 21 between adjacent BSSs is substantial to allow for switching between one AP 18 another AP 19. To avoid interference, the adjacent APs 18, 19 are assigned different frequency channels among the eleven channels provided under the IEEE 802.11 standard.

This roaming capability also results from an ability of the MU 10 to determine the quality of a signal from each AP 18, 19 in range and to determine when to switch to from an AP 18 to another AP 19, from which a stronger or cleaner signal is received, as determined by the signal-to-noise (S/N) ratio of the signal. Even when an MU 10 is associated with an AP 18, the MU 10 monitors the beacon frames transmitted by other APs 19. These beacon frames contain link measurement data and information describing the transmitting AP 19. When a comparison of S/N ratios indicates that a switch should be made, the MU 10 transmits authentication information and attempts the reassociate with the new AP 19.

A reassociation service requested by the MU 10 and provided by the new AP 19 provides for changing the association with the MU 10 from one AP 18 to another AP 19, without a requirement, as the term might be construed to imply, that the MU 10 had previously been associated with the new AP 19. In the process of reassociation, the MU 10 transmits information telling the new AP 19 the identity of the old AP 18, from which the switch is being made. Then, the new AP 19 gets ANY data frames left at the old AP 18 and notifies the old AP 18 not to accept messages for the MU 10.

Because of the complex characteristics of radio transmission in many environments, and because of the fluid nature of a BSS 16 which MUs 10 can constantly enter, leave, and request various services, changing loading conditions of the AP 18, the process of designing a WLAN to reliably transmit messages under foreseeable conditions is difficult. Under ideal conditions, a single AP 18 of a commercially available type can communicate with up to 128 MUs 10 at distances up to 457 m (1500 ft). Under actual conditions in commercial buildings APs 18, 19 may need to be spaced to provide maximum operating distances of only 15.2 to 30.5 m (50 to 100 ft). The placement of APs 18, 19 and the types of radio antennas to use with them, which may be omnidirectional or directional, is also determined by sources of interference, such as microwaves ovens, cellular phones, mechanical rooms for air conditioning units, other communications equipment, and elevators.

Due to such complexities, an actual operating WLAN environment may include gaps in coverage by the APs 18. This is particularly true if one of the APs 18 cannot be accessed by an MU 10 because the AP 18 has failed or become overloaded with other communications. Furthermore, it may be possible that the entire possible WLAN environment is not covered by APs due to budget constraints. What is needed is a method for an MU 10 outside all of the infrastructure BSSs 16, 17 to be able to access the AP 18, 19 in one of the infrastructure BSSs 16, 17.

U.S. Pat. Nos. 5,884,031 and 6,249,810 describe methods for connecting client devices in a wired network to receive information and also to retransmit the information to other client devices, so that information can be broadcast from a single server or Internet transmitter to a number of client devices much greater than the number of such devices that can be directly connected to the server or Internet transmitter itself.

In the method of U.S. Pat. No. 5,884,031, a pre-determined number of client systems are first allowed to connect directly to a server system. After this occurs, the server furnishes additional client systems requesting connection with the addresses of client systems already connected to form a private network. Each of the client systems then makes connections with a multiple number of client systems to receive information from the server system. Each of these client systems subsequently accepts connections from up to a second predetermined number of client systems to which it transmits information received from the server system.

In the method of U.S. Pat. No. 6,249,810, a client system, operating as a "radio device" and employing a specialized graphical user interface, receives a list of Internet "radio station" transmitters. To hear a broadcast, the user selects a station from this list, causing the client system to contact a transmission scheduler connected to the Internet. The transmission scheduler causes the client system to be connected in a chain, generally to receive information retransmitted from another client system. The transmission scheduler supervises these connections, making new connections as needed when client systems sign off.

What is needed is a method for connecting client systems by radio links to achieve access to a access point, without a need to first access a central point, such as the server system of U.S. Pat. No. 5,884,031 or the transmission scheduler of U.S. Pat. No. 6,249,810.

SUMMARY OF THE INVENTION

In accordance with a first aspect of the invention, a method is provided for wireless data communication between an access point connected to a communication network and a remote mobile unit, out of range of direct wireless communication with the access point. The method includes first and second steps. In the first step a path is established between the remote mobile unit and the access point, wherein the path includes one or more intermediate mobile units, wherein a first intermediate mobile among the intermediate mobile units communicates directly by radio with the access point, and wherein pairs of mobile units adjacent one another along the path communicated directly with one another by radio. In the second step, data is sent along the path between the remote mobile unit the access point, wherein each the intermediate mobile unit in the path receives data transmitted by wireless along the path in a first direction, and wherein each the intermediate mobile unit in the path then transmits the data to continue in the first direction along the path.

Preferably, the first step includes:

generating remote access request information, including an address identifying the remote mobile unit, within the remote mobile unit;

transmitting the remote access request information by radio from the remote mobile unit;

receiving the remote access request information by radio in each intermediate mobile unit in the path, adding an address identifying the intermediate mobile unit as a part of the path to the remote access request information, and then retransmitting the remote access request information by radio from the intermediate mobile unit;

receiving the remote access request information by radio in the access point;

generating remote access response information, including an address identifying the access point, within the access point;

transmitting the remote access response information by radio from the access point;

receiving the remote access response information by radio in each intermediate mobile unit in the path as the remote access information is transmitted from the access point to the remote mobile unit, wherein each intermediate mobile unit is identified as being within the path by the address identifying the intermediate mobile unit, and then retransmitting the remote access response information by radio from the intermediate mobile unit;

receiving the remote access response information by radio in the remote mobile unit; and storing the addresses identifying each the intermediate mobile unit in the path and the access point.

Preferably, the second step includes:

generating data information within the remote mobile unit;

adding the addresses, identifying each the intermediate mobile unit in the path and the access point, to the data information generated within the remote mobile unit;

transmitting the data information generated within the remote mobile unit by radio from the remote mobile unit;

receiving the data information generated within the remote mobile unit by radio in each intermediate mobile unit in the path as the data information generated within the remote mobile unit is transmitted from the remote mobile unit to the access point, wherein each the intermediate mobile unit is identified as being within the path by the address identifying the intermediate mobile unit, and then retransmitting the data information generated within the remote mobile unit by radio;

receiving the data information generated within the remote mobile unit by radio in the access point;

deleting the addresses, identifying each the intermediate mobile unit in the path and the access point, from the data information generated within the remote mobile unit; and sending the data information generated within the remote mobile unit along the communication network from the access point.

DETAILED DESCRIPTION OF THE INVENTION

Figure 3:
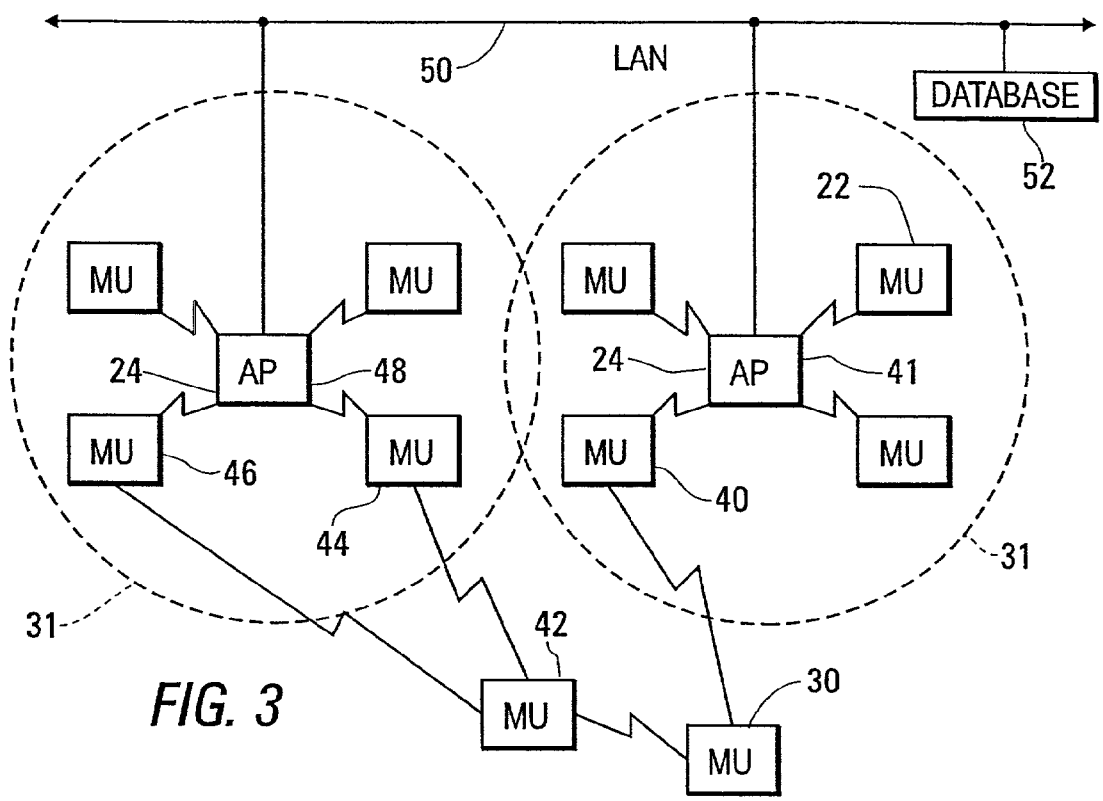
FIG. 3 is a block diagram of a system including mobile units and access points, with a first mobile unit outside range of the access points associating with one of the access points in accordance with the invention.

FIG. 3 is a block diagram of a system including mobile units (MUs), in general indicated as 22, and access points, in general indicated as 24, with a particular MU 30 outside range of the APs 24 associating with one of the APs 24 in accordance with the method of the invention. Each of the APs 24 is surrounded by a basic service set (BSS) 31 including MUs 22 which can directly associate with the AP 24 by conventional means.

Figure 5:
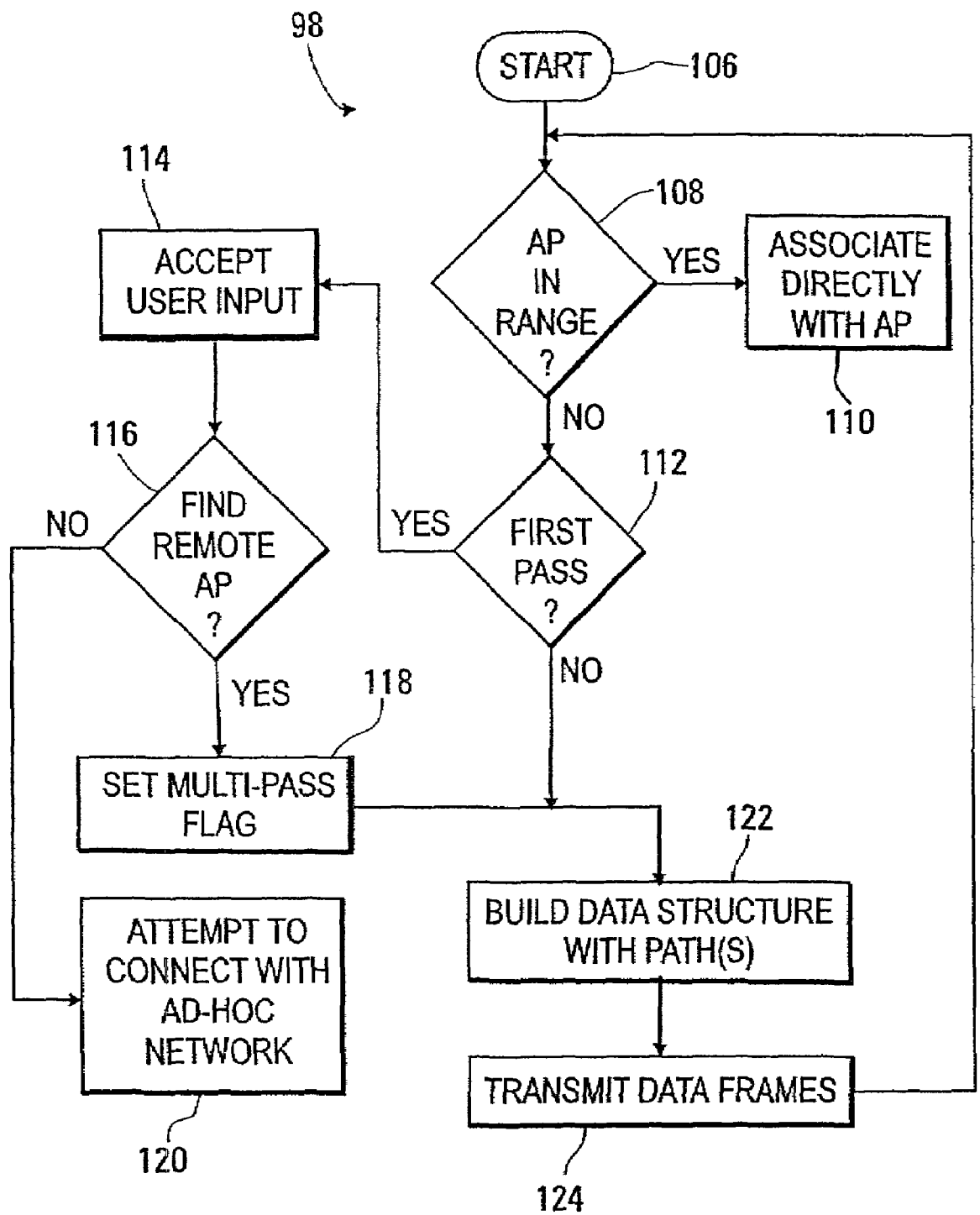
FIG. 5 is a flow chart of a remote access routine executing within the first mobile unit of FIG. 3.
Figure 6:
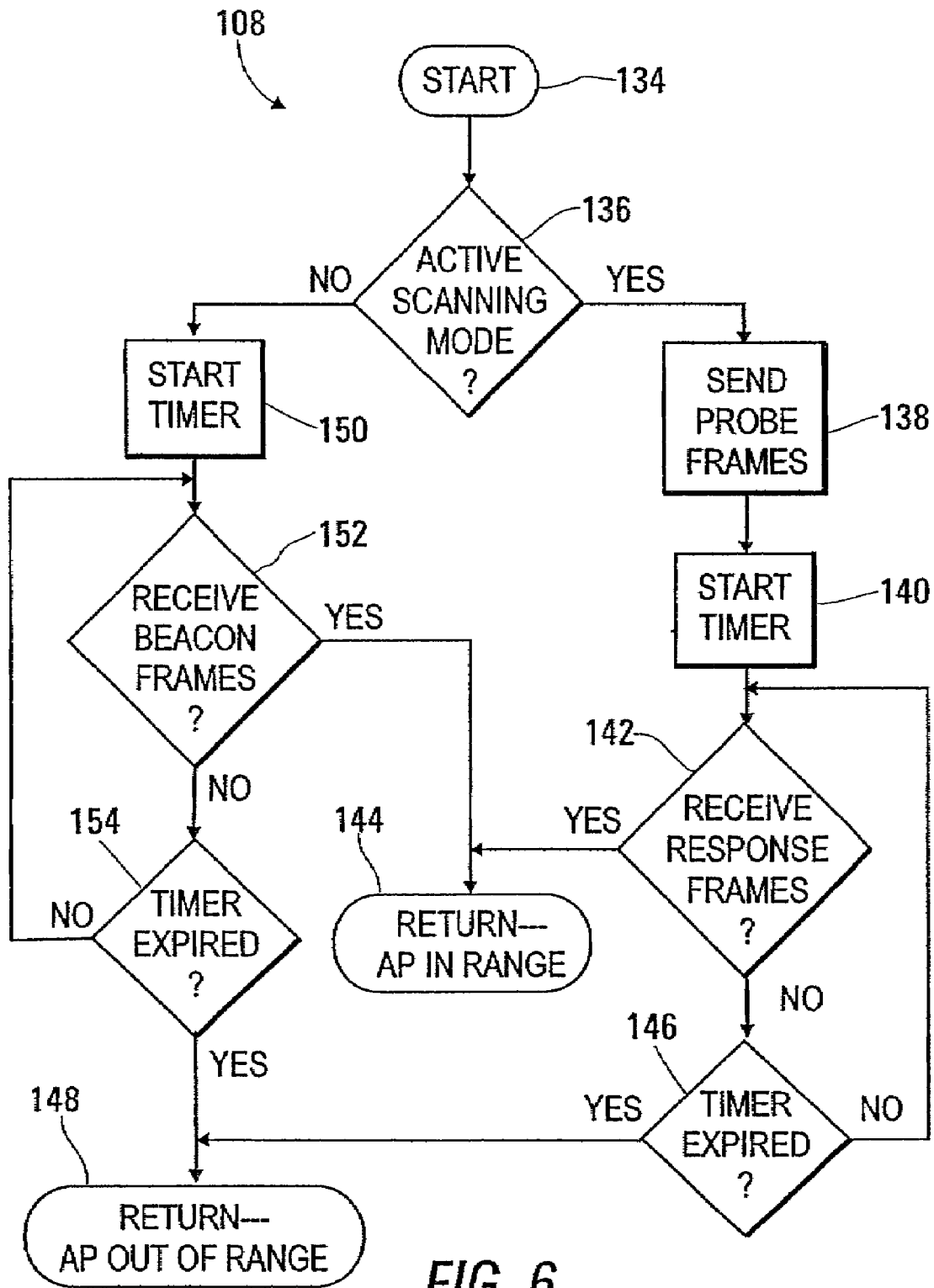
FIG. 6 is a flow chart of a subroutine, within the remote access routine of FIG. 5, for determining whether an access point is in range of the first mobile unit.

According to the method of the present invention, the MU 30 first determines, by a process to be explained in reference to FIGS. 5 and 6, that it is outside the range of all access points 24. Then, having failed to associate with an AP 24, the MU 30 sends remote access request frames attempting to contact another MU 22 to gain access through the other MU 22 to an AP 24. Preferably, the remote access request frames include the Media Access Control (MAC) address of the originating MU 30. One or more of the MUs 22 in the area, such as MUs 40, 42 are close enough to the MU 30 to receive the remote access request frames. Each MU 22 receiving the remote access request frames attaches its own MAC address to the remote access request frames and attempts to forward then to an AP. Since MU 40 is already associated with AP 41, it transmits the remote access request frame directly to this AP 41. Since the other MU 42 receiving the remote access request frames from the MU 30 is not associated with an AP, it rebroadcasts the remote access request frames, to which it has added its own MAC address. This rebroadcast is received by two MUs 44, 46, each of which is attached to an AP 48. Then, each of these MUs 44, 46 adds its MAC address to the request frames and forwards them to the AP 48.

When an AP 24 receives the remote access request frames, it individually determines whether to accept the request for association by an application of the authentication process. In the example of FIG. 3, the APs 41, 48 are connected to a LAN 50, through which a database 52 is accessed to obtain a list of MAC addresses belonging to MUs 22 that are to be provided access to the LAN. If such a list is to be used to limit access to the LAN, the APs 41, 48 compare the MAC address of the MU 30 requesting access to this list, allowing the process of association to continue only if a match for the MAC address is found. In general, the various versions of the authentication process conventionally applied to an MU 22 attempting to associate with an AP 24 from within an BSS 31 may be applied to the MU 30 trying to gain access from outside all BSSs 31.

After determining to associate with the MU 30, each AP 24 begins the process of returning approval frames to the MU 30. These approval frames include the MAC address of the AP 24, additional data conventionally transmitted from an AP 24 to an MU 22 during the association process, the MAC address of the MU 24 for which this transmission is intended, and the MAC address of all of the intermediate MUs frames used in the transmission of the request frames to the AP 24. The approval frames are then transmitted along the path from which they were received, but in the reverse order. In the example of FIG. 3, AP 41 transmits approval frames to MU 40, which in turn retransmits them to the requesting MU 30. Also, AP 48 transmits approval frames to MUs 44 and 46, each of which in turn retransmits them to MU 30.

In general, the requesting MU 30 receives multiple instances of approval frames, being returned along multiple paths. Preferably, an MU 30 requesting association with an AP 24 from a location outside the BSSs 31 in accordance with the invention, like an MU 22 using conventional methods to request association with the AP 24, is allowed to associate with only one AP 24 at a time. In addition, according to a preferred version of the invention, only one path between the path between the requesting MU 30 and the AP 24 can be used at a time.

While the invention provides a way to transfer data frames through a relatively large number of MUs 22, it is understood that a significant time delay is to be expected to occur in such a transmission. An increase in the time required to transmit data may have the effect of making data transmission unreliable. Therefore, the determination of which path to take among several alternatives is preferably made by determining the path taking the least transmission time. Alternately, the path involving transmission through the fewest intermediate devices may be chosen. Normally, this path is the one taking the least time, although it is possible that certain devices may retransmit more slowly than others, so that a path proceeding through more devices may require less time. Finally, signal quality may play a part, at least in rejecting paths having unacceptable signal quality. In this regard, it is understood that conventional MUs have means for choosing a single AP from several APs with overlapping ranges to satisfy requirements for roaming, and that the methods used to do this may be applied to the problem of choosing a path through several devices Another issue regarding the selection of a path between the requesting device 30 and an AP 24 relates to the bandwidth available within the intermediate MUs 22 which may be chosen to become part of the path. A commitment to become part of the path and to therefore transmit frames to and from the requesting MU 30 can be expected to use a significant part of the bandwidth available within the MU 22. While the APs 24 are capable of handling associations with a large number of MUs 22, the MUs 22 do not have such a capability. Therefore, in one version of the invention, each path is chosen to extend only among MUs 22 which are turned on, but which are not actively executing processes requiring communication with the AP 24. For example, such an MU 22 may be authenticated by one or more APs 24 without being associated with the AP 24. This version operates by exploiting unused bandwidth within the WLAN. Alternately, an MU 10 may accept a position in the path between another MU 30 and an AP 24 even when it is associated with the AP 24 and executing a process requiring the communication of data with the AP 24. Alternately, the MU 22 may accept different numbers of connections within paths between requesting MUs 30 and APs 24. For example, an MU 22 may accept being placed in only one such path if it is executing a process requiring communication with an AP 24, and may accept being placed in two such paths if it is not executing such a process. The conditions under which a particular MU 22 should accept placement in such a path may depend on its location. For example, the user of an MU 22 may wish to support such a connection under one set of conditions within his workplace, where a company-owned LAN is provided for the cooperative use of a number of employees, and under another set of conditions in a public place, where an AP 24 is made available for a number of customers wishing to connect to the Internet. Therefore, the parameters used to determine whether to accept placement in such a path can preferably be reconfigured by the user of the MU 22.

Figure 4:
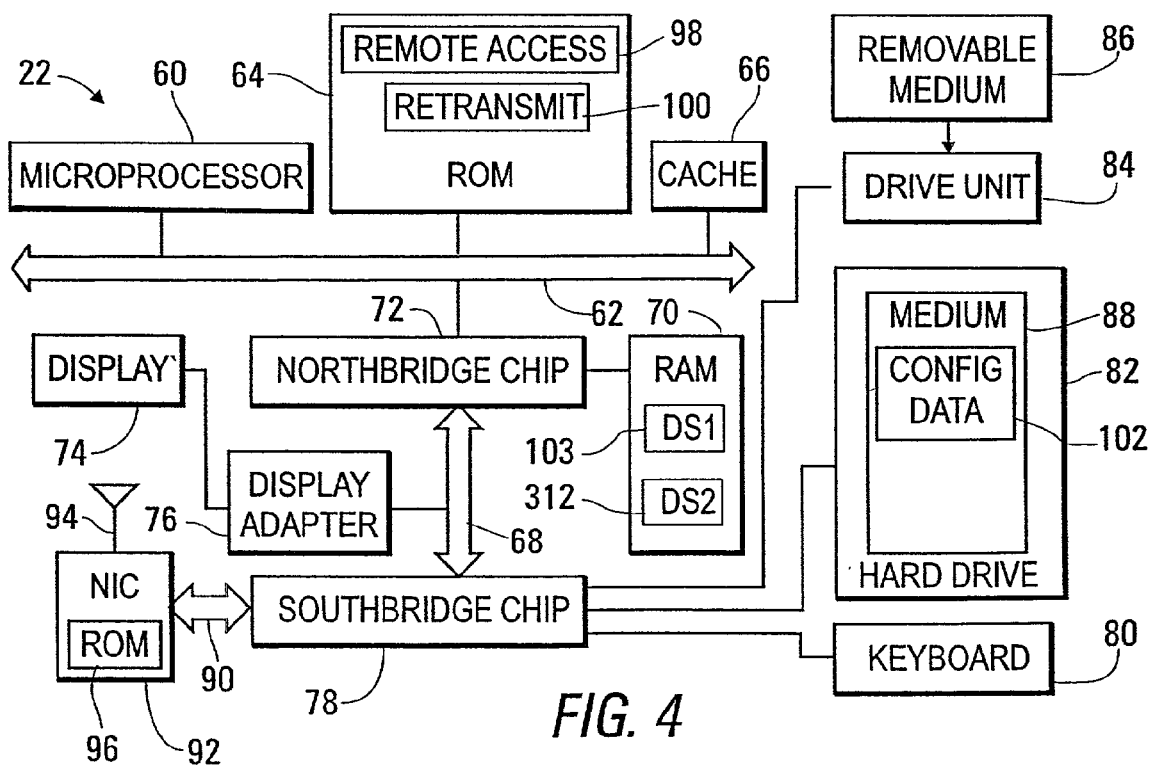
FIG. 4 is a block diagram of a mobile unit within FIG. 3.

FIG. 4 is a block diagram of an MU 22 storing routines to be available for operation in accordance with the invention. For example, as described above in reference to FIG. 3, the MU 22 may be the MU 30 initiating the attempt to remotely access an AP 24 or any one of the MUs 40, 42, 44, 46 transferring frames between the MU 30 and the APs 24. The MU 22 includes a microprocessor 60 connected to a system bus 62, along with a read only memory (ROM) 64 and a random access cache memory 66. The system bus 62 is also connected to a Peripheral Component Interconnect (PCI) bus 68 and to random access memory (RAM) 70 through a Northbridge chip 72. A display screen 74 is connected to the PCI bus 68 through a display adapter 76. A Southbridge chip is also connected to the PCI bus 68, to provide control functions for a keyboard 80, a hard disk drive 82, and a drive unit 84 reading from and writing to a removable medium 86, such as a floppy diskette. The hard disk drive 82 reads from and writes to an internal, nonremovable magnetic disk medium 88. The Southbridge chip 78 is also connected to a Card Bus 90, which provides connections for a network interface card (NIC) 92, in the form of a PC Card, including a radio device providing access to a WLAN through an antenna 94. Thus, the MU 22 is, for example, a notebook computer enabled for connection to a WLAN through the PC Card NIC 92.

The NIC 92 includes a ROM 96 storing a Media Access Control (MAC) address provided during the process of manufacturing the NIC 92. This MAC address is used to identify the MU 22 for conventional purposes associated with connection to a WLAN and particularly for the purposes associated with the present invention.

The RAM 70 and cache 66 are typically volatile memories that lose the information stored within them when electrical power is turned off to the MU 22. The ROM 64 is typically a nonvolatile memory, which retains information stored within them when power is turned off. Information that must be retained in this way can also be stored in the hard disk drive medium 88 and on the removable medium 86. The microprocessor 60 executes routines using instructions stored within the ROM 64, the cache 66, and the RAM 70. Program instructions are loaded into the RAM 70 from the hard disk drive 82, from the drive unit 84, and possibly from the ROM 64.

In accordance with a version of the present invention, the ROM 64 stores a remote access routine 98 and a retransmit routine 100. The remote access routine 98, when executing in the microprocessor 60, provides for making a remote connection with an AP 24 that is out of range of the MU 22. This routine 98 is explained in detail below with reference to FIG. 6. The retransmit routine 100, when executing in the microprocessor 60, provides for assisting another MU 22 to establish such a connection by becoming a part of a chain of MUs 22 transmitting messages to and from an AP 24.

Additionally, in accordance with the present invention, the hard disk drive medium 88 provides particular locations for configuration data 102. The configuration data 102 is placed in a specific location in response to the actions of the user, with the configuration data determining parameters of operation of the remote access routine 98 and the retransmit routine 100.

Preferably, data is written within a first data structure 103 in the RAM 70 during execution of the remote access routine 98 as the MAP addresses of MUs 22 providing paths to a remote AP 48 are stored.

Alternately, the remote access routine 99 and the retransmit routine 100 are loaded to an MU 22 not including such information in ROM 64, with these routines 98, 100 instead being installed through the drive unit 84 from the removable medium 86, to be stored within the hard disk drive medium 88 for execution within the microprocessor 60.

The remote access routine 99 and the retransmit routine 100 may be provided separately or together as computer program products in the form of encoded signals recorded on a removable computer usable medium 86. Alternately, the remote access routine 99 and the retransmit routine 100 may be provided separately or together as computer program products in the form of computer data signals embodied in a carrier wave for transmission through a modem (not shown), through a network interface adapter (not shown), or as wireless signals through the wireless network interface card 92.

FIG. 5 is a flow chart of processes occurring within the MU 22 during the execution of the remote access routine 98 within the microprocessor 60. The remote access routine 98 starts in step 106 in response to a user input or in response to a call from another program indicating that an attempt is to be made to communicate through the NIC card 92. Some of the boxes shown in FIG. 5 represent single process steps, while other boxes represent subroutines. Some of the subroutines are explained in detail in reference to other figures, while other subroutines are not explained in detail since they comprise conventional process steps presently used by a conventional MU to access an AP 24 directly, within range, or to form part of an ad-hoc network of conventional MUs. It is understood that the particular configuration of process steps and subroutines shown in FIG. 5 has been chosen as exemplary to facilitate an explanation of operation of the MU 22 in accordance with the invention, and that other configurations, including some not using such subroutines, can be used without departing from the scope of the invention.

After the remote access routine 98 starts in step 106, a subroutine 108, which is described below in reference to FIG. 6, is executed for determining whether an AP 24 is within the range of the present MP 22. If the subroutine 108 determines that an AP 24 is within range, the system proceeds to a subroutine 110, in which the MU 22 associated directly with an AP 24 by conventional processes, presently used to become part of a BSS 31.

Figure 8:
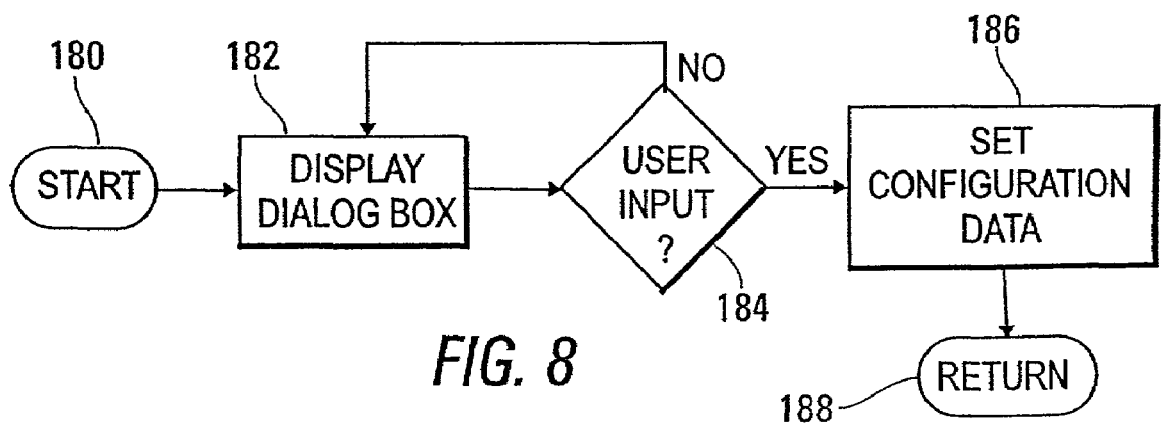
FIG. 8 is a flow chart of a subroutine, within the remote access routine of FIG. 5, for receiving user input with the dialog box of FIG. 7.

If the subroutine 108 determines that an AP 24 is not within range, the system instead proceeds to step 112, in which a multi-pass flag is examined to determine whether the present pass is the first one through the routine for this particular attempt to communicate. If this is the first pass, the system proceeds to a subroutine 114, in which a user input is received. This subroutine 114, which will be explained in detail in reference to FIG. 8, is used to set the configuration data 102 (shown in FIG. 4) to reflect the wishes of the user. In particular, the user is provided with a means for indicating whether an attempt is to be made to associate with a remote, out of range AP 24, or whether an attempt is alternately to be made to form part of an ad-hoc network. Then, in step 116, the configuration data 102 is examined to determine if association is to be sought with a remote AP 24. If association with a remote AP 24 is to be sought, the system proceeds to step 116 to set the multi-pass flag, so that this user input will not be again sought if it becomes necessary to go through this part of the remote access routine 98 again. Otherwise, the system proceeds to a subroutine 120 in which conventional process steps are used to attempt to connect the MU 22 as part of an ad-hoc network of MUs 22.

After the multi-pass flag is set in step 118 during a first pass through the remote access routine 98, or following a determination in step 112 that the present pass is not a first pass, the system proceeds to a first data structure subroutine 122, in which a first data structure 103 is built to store data describing alternative paths between the MU 22 and one or more APs 24 responding to remote access request frames transmitted by the MU 22. The first data structure subroutine is explained in detail below in reference to FIG. 9, and the form of the first data structure 103 is explained in detail below in reference to FIG. 10.

After completion of the first data structure subroutine 122, the system proceeds to a remote data transmission subroutine 124, in which frames are transmitted in both directions along one or more of the paths represented by data stored within the first data structure 103. In general, the remote data transmission subroutine 124 continues to operate until the MU 22 is shut off, with the subroutine 124 remaining available to transmit data frames as they are otherwise made available for transmission, and to receive remote data frames as the are made available. The remote data transmission subroutine 124 is explained in detail below in referenced to FIG. 11.

Figure 1:
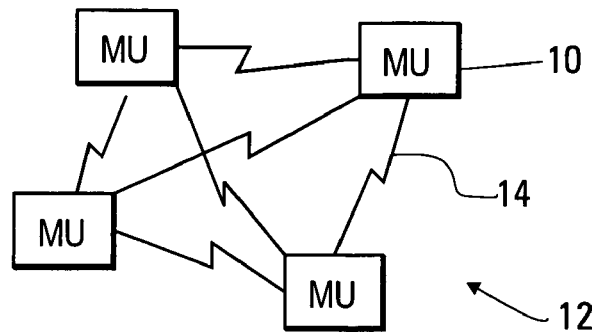
FIG. 1 is a block diagram of a number of mobile units connected in a conventional manner to form an ad-hoc network.
Figure 2:
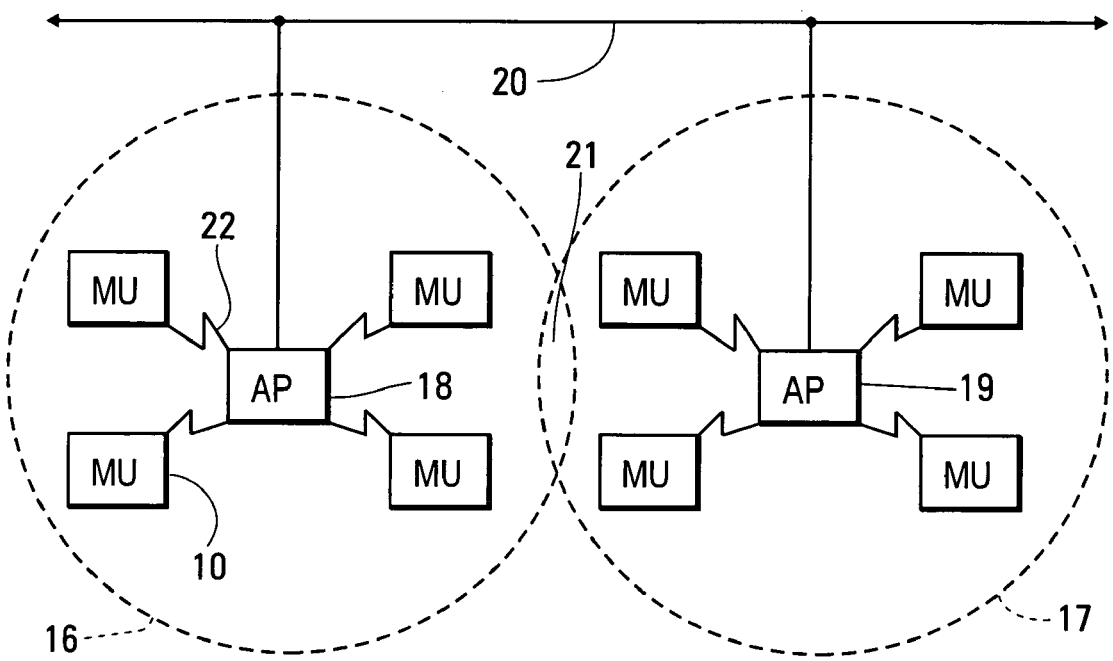
FIG. 2 is a block diagram of a number of mobile units connected in a conventional manner to form a pair of infrastructure basic service sets.

When a problem is detected by examining a data frame which has been received, the next path stored within the first data structure is tried to see if the problem can be solved. If there is no next path remaining within the first data structure 103, the system returns from the data transmission subroutine 124 to step 108, so that one or more new paths may be found. This capability is needed to maintain data transmission when changes occur within the system of MUs 22 and APs 24. In the example of FIG. 2, the MU requesting a remote connection may move out of range of the MU 40, through which the remote connection with AP 41 is initially established, while remaining in range of the MU 42, so that one of the paths through the MU 42 can be used to restore effective communications. Alternately, the MU 40, through which communications have been established, may become unavailable due to physical movement, a change in usage, or even being turned off. In such instances, alternate paths are used to keep communications going.

FIG. 6 is a flow chart of the subroutine 108 for determining whether an AP 24 is in range of the MP 22 trying to associate with an AP 24. The subroutine 108 forms a part of the remote access routine 98, described above in reference to FIG. 5. After the subroutine 108 starts in step 134, a determination is made, in step 136 of whether an active scanning mode has been enabled. For example, the configuration data 102 may be examined to determine whether the active scanning mode has been enabled. If active scanning is enabled, the system proceeds to step 138, in which probe frames, including the MAC address of the MU 22, read from ROM 96 in the NIC CARD 92, in an attempt to elicit a direct response from an AP 24. Then, in step 140, a timer is started to limit the time during which the system will wait to receive probe response frames.

If an AP 24 is within range, and if the probe frames meet established criteria, the AP 24 transmits probe response frames, indicating an ability to associate with the MU 22, and providing various information about the AP 24, including its MAC address. In step 142, a determination is made of whether these probe response frames have been received. If they have, the system returns from the subroutine 108 in step 144, having stored the fact that an AP 24 is within range, to associate directly with the AP 24 in a conventional manner, in subroutine 110. If the timer set in step 140 expires in step 146 before probe response frames are determined to be received in step 142, the system returns from the subroutine 108 in step 148 to begin the process, explained above in reference to FIG. 5, of determining whether to seek association with a remote AP 24 or to seek inclusion within an ad-hoc network of MUs 22.

If a determination is made in step 136 that the active scanning mode of the MU 22 has not been enabled, a passive scan is begun, with a timer being started in step 150. Beacon frames transmitted by APs 24 are monitored. When such frames are received, as determined in step 152, the system returns from the subroutine 108 in step 144, to associate directly with an AP 24 transmitting the beacon frames in a conventional manner within the subroutine 110 (shown in FIG. 5). If the timer started in step 150 expires, as determined in step 154, before beacon frames are received, the system returns from the subroutine 108 in step 148 to begin the process, explained above in reference to FIG. 5, of determining whether to seek association with a remote AP 24 or to seek inclusion within an ad-hoc network of MUs 22.

Figure 7:
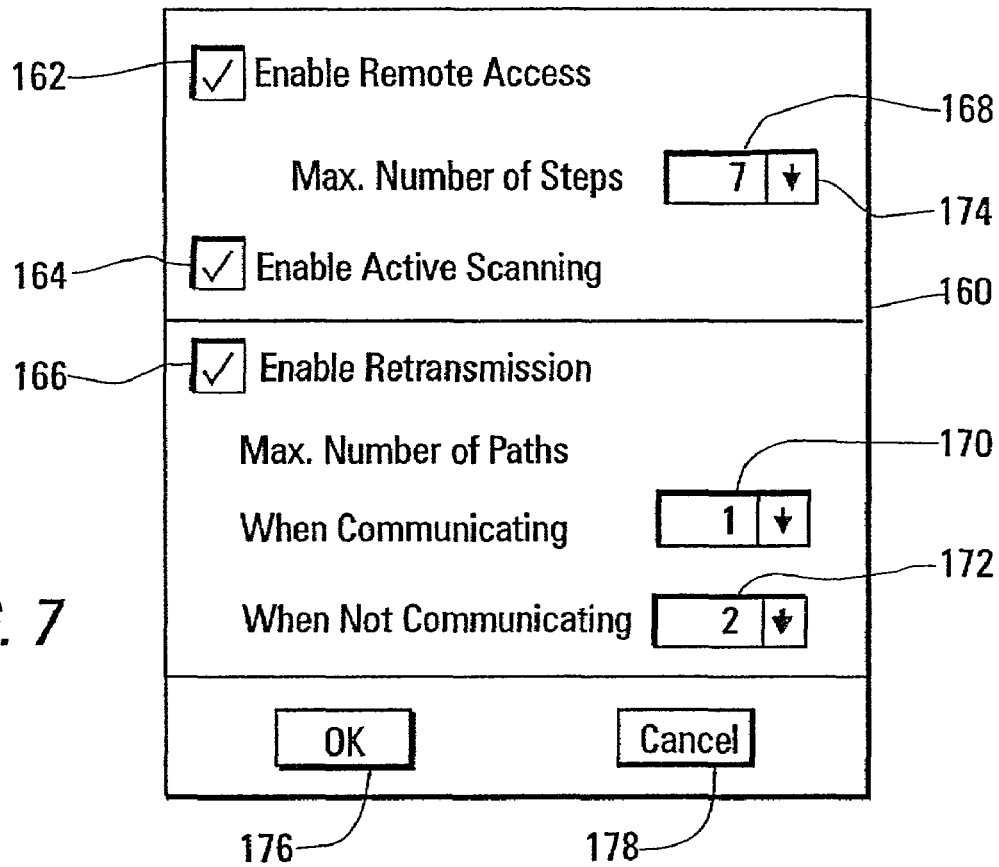
FIG. 7 is a display view of a dialog box displayed to form a graphical user interface during execution of the remote access routine of FIG. 5.

FIG. 7 is a display view of a dialog box 160 displayed by a graphical user interface (GUI) in accordance with the present invention to provide the user of the MU 22 with a convenient means for providing inputs to set the configuration data 102. The dialog box 160 includes a first checkbox control 162, which is selected to enable operation of the MU 22 to achieve remote axis when out of range of an AP 24, and which is cleared to allow the MU 22 to seek inclusion within an ad-hoc network when there is no AP 24 in range. A second checkbox control 164 is set to enable active scanning in a search for a direct connection with an AP 24 and is cleared to provide for passive scanning. A third checkbox control 166 is set to enable the MU 22 to be used to retransmit frames to and from another MU 22 attempting to gain remote access to an out-of-range AP 24 and cleared to prevent such usage of this MU 22. Each of the checkbox controls 162, 164, 166 presents a conventional interface, being set and cleared by positioning the cursor over the checkbox control and depressing the left mouse button.

The dialog box 160 additionally includes a first drop-down list box control 168, which is used to set the maximum number of steps between MUs 22 along a communication path extending between a remote AP 24 and the MU 22 itself when requesting association with the remote AP 24. Any path with more steps than the number indicated in the list box control 168 will be rejected by the remote access routine 98 executing within the microprocessor 60. A second drop-down list box control 170 is used, during operation of a communications program in the MU 22, to set the maximum number of paths through which access will be granted to other MUs 22 requesting remote access to an AP 24. This feature is used to secure sufficient bandwidth for operation of the communication program. This number can be set to zero. A third drop-down list box control 172 is used, when a communications program is not operating in the MU 22, to set the maximum number of paths through which access will be granted to other MUs 22 requesting remote access to an AP 24. Each drop-down list box control 168, 170, 172 presents a conventional interface, with an arrow button 174 being selected to cause the list box control to open, with the cursor being moved to select a value from a list of possible values, and with this value being selected using the left mouse button. Such a selection also causes the list box control to close.

After the user is satisfied with the settings displayed in the dialog box 160, he selects a first command button 176, causing the values shown in the dialog box 160 to be stored as the configuration data 102 and causing the dialog box 160 to be closed. On the other hand, if the user decides not to change the values of configuration data 102 which were in place before the dialog box 160 was opened, he can simply cause the dialog box 160 to be closed by selecting the second command button 178.

As shown in the example of FIG. 7, the dialog box 160 provides the user with a great deal of control over the processes associated with accessing a remote AP 24. Alternately, some of the settings may be made automatically. For example, if it is impractical to have more than one, or even one, additional connection to an MU 22 running a communication program, this fact may taken into consideration in determining the configuration data 102 without providing a user option for its selection. On the other hand, the process of setting the configuration data may be modified to enforce a kind of equity into the system, with the MU 22 being enabled to seek association with a remote AP 24 only when it is also configured to assist other MUs 22 seeking such association. The use of drop-down list box controls has an advantage of restricting the user to choosing among apparently reasonable alternative values; otherwise a text box control may be used, allowing the user to type in a value, or a drop-down combo box control may be used, allowing the user to type in a value or to choose a value from a drop-down list. It is also possible for the manager of the WLAN to preset the values for all MUs allowed within the network. In this case the user would not be able to change the default values.

FIG. 8 is a flow chart showing processes occurring during the execution of the subroutine 114 for accepting user input to set the configuration data 102 (shown in FIG. 4). This subroutine 114 forms part of the remote access routine 98, described above in reference to FIG. 5. After determining, within the routine 98, that the MU 22 is out of range of an AP 24, and after determining that this is a first pass through the routine 98, for this particular attempt to communicate, the subroutine 114 is executed to present a GUI enabling the user to provide indications that will be used to set the configuration data 102, indicating, for example, whether he wants the MU 22 to seek access to the LAN 50 through a remote, out-of-range AP 24 or to become part of an ad-hoc network.

After starting in step 180 the subroutine 114 causes the dialog box 160, described above in reference to FIG. 7, to be displayed in step 182. After making the changes he desires, the user provides an input indicating that he is through with the interface by selecting one of the command buttons 176, 178. After such a user input has been detected in step 184, the settings displayed in the dialog box 160 are applied to the configuration data 102 in step 186, and the dialog box 160 is closed. Then, in step 188, the system returns from the subroutine 114.

Figures 9, 10:
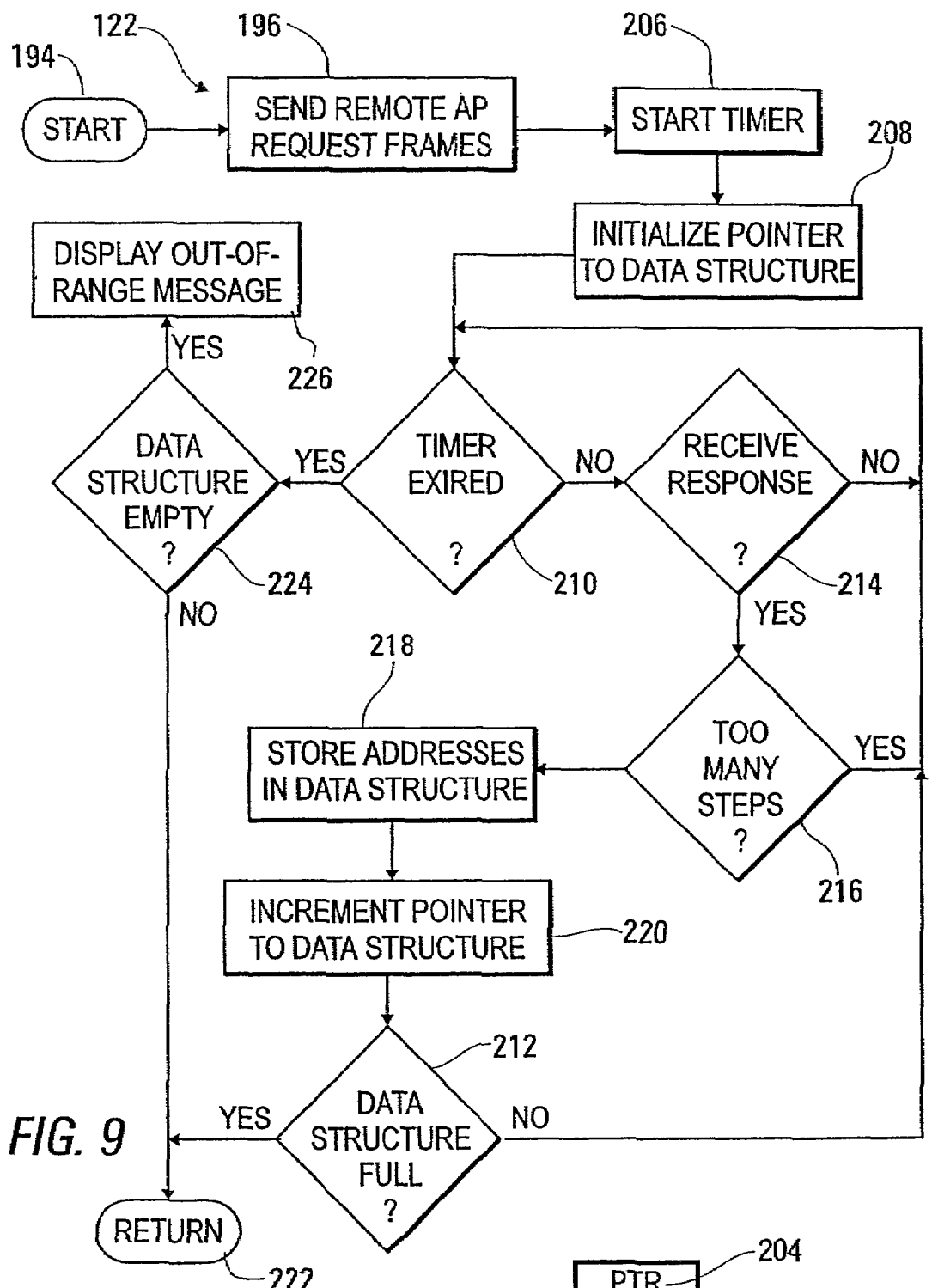
FIG. 9 is a flow chart of a subroutine, within the remote access routine of FIG. 5, for building a first data structure of addresses forming paths between the first mobile unit and one or more remote access units.
FIG. 10 is pictographic view of the first data structure built during execution of the subroutine of FIG. 9.

FIG. 9 is a flow chart of processes occurring during execution of the first data structure subroutine 122, forming a part of the remote access subroutine 98 described above in reference to FIG. 5. The first data structure subroutine fills the first data structure 103 (shown in FIG. 4) with address information defining the data paths returned for use to transmit data between the MU 22 requesting access and an AP 24. Thus, after the subroutine 122 is started in step 194, remote AP request frames are sent in step 196. These frames initiate a process, which will be explained in reference to FIG. 12, causing other MUs 22 to direct the remote AP request frames to one or more APs 24 and to direct response frames from the APs 24 toward the MU 24 making the request.

As also explained above in reference to FIG. 2, each MU 22 receiving the AP request frames and forwarding them, first adds its MAC address to the frames. Thus, when the frames arrive at an AP 24, they include the MAC addresses of all the MUs 22 through which they have been sent. The AP 24, in responding to these frames first adds its own MAC address. Then, the frames are returned to the MU 22 originating the request, following the path taken to the responding AP 24 in reverse order, so that, when the response frames are received by the AP 22 originating the request, the path is identified by a list of MAC addresses.

FIG. 10 is a pictographic view of the first data structure 103 stored within the RAM 70 of the MU 22 (as shown in FIG. 4). The first data structure 103 includes a number of entries 200, indicated as rows, and a number of fields 202, indicated as columns. Each entry 200 includes the MAC addresses of devices, such as other MUs 22 forming an individual path between the MU 22 requesting remote access and an AP 24 which can provide such assess by associating with the MU 22 in accordance with the invention. Each entry 200 also includes the MAC address of the AP 24, as well. The example of FIG. 10 has been constructed to represent the exemplary configuration of FIG. 3, with AM40 indicating the MAC address of MU 40, etc., and with AA 41 indicating the MAC address of AP 41, etc. The first data structure 103 also includes a pointer 204 n the form of an address stored in a pointer register to determine the address of an entry 200 to which data is to be written or from which data is to be read. First data structures including entries, data fields, and pointers of this sort are well known in the computer art.

Referring to FIGS. 9 and 10, after the remote AP request frames are sent in step 196, a timer is started in step 206 to provide a maximum time to wait for response frames to be returned. The pointer 204 is then initialized in step 208 to point to the first entry 200 in the first data structure 103. Then, until either the timer set in step 206 is determined in step 210 to have expired, or until it is determined in step 212 that the first data structure is full, the system waits to receive response frames sent from an AP 24 through one or more intermediate MUs 22 in response to the remote AP request frames sent in step 196.

After response frames are received, as determined in step 214, a determination is made in step 216 of whether there are too many steps in the path. For example, this determination is based on a comparison between the number of MAC addresses of intermediate MUs 22 returned with the response frames and a maximum allowable number of steps, which is stored in the configuration data 102, and which may be changed with the checkbox control 168 of dialog box 160 (shown in FIG. 7). If there are too many steps, this path is not used; otherwise, the MAC addresses returned with the response frames are stored in an entry 200 within the first data structure 102 in step 218. Then, in step 220 the pointer 204 is incremented to point to the next entry within the first data structure 103.

This process causes the MAC addresses defining the path first received by the MU 22 to be stored in the first entry 100 of the first data structure 103, and for the MAC addresses defining the path received next to be stored in each successive entry 200 of the first data structure 103. The size of the first data structure, I.e., the number of paths that can be stored in this way is determined, for example, from the configuration data 102.

When the first data structure 103 is full, as determined in step 212, the system returns from the subroutine 122 in step 222. When the timer expires, as determined in step 210, a determination is made in step 224 of whether the first data structure 103 is empty. If it is, an error message is displayed in step 226, indicating that the MU 22 making the request is out of range of other MUs 22, or that other MUs 22, within range of the MU 22 making the request, are themselves out of range of connection with an AP 24. If it is determined in step 224 that there is data for at least one path stored in the first data structure 103, the system returns from the subroutine 122 in step 222.

Figure 11:
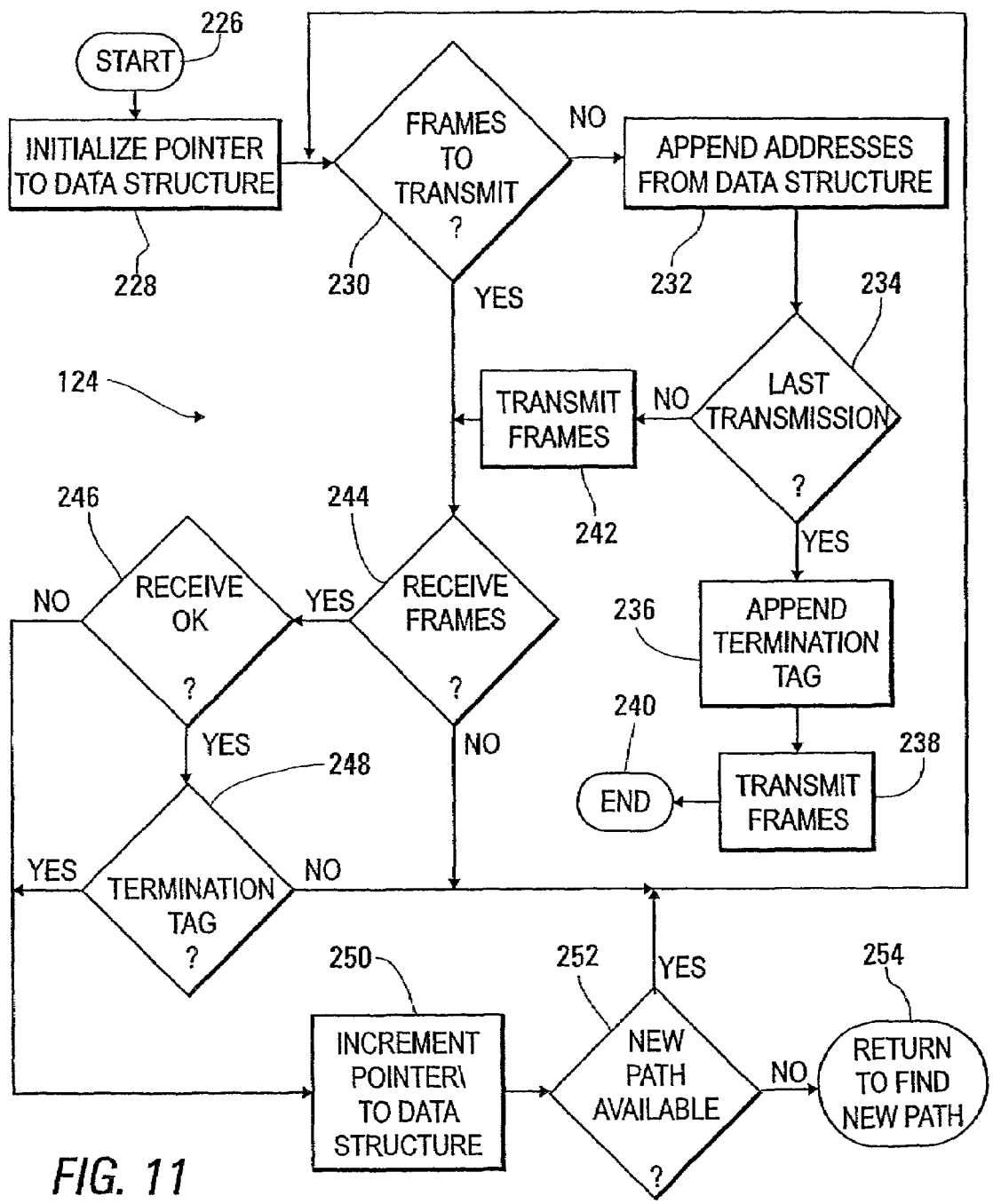
FIG. 11 is a flow chart of a subroutine, within the remote access routine of FIG. 5, for transmitting and receiving data frames.

FIG. 11 is a flow chart showing a process occurring during the execution of a remote data transmission subroutine 124, for transmitting and receiving data frames, forming a part of the remote access routine 98, described above in reference to FIG. 5. The remote access data transmission subroutine 124 starts in step 226 after the system returns from the first data structure subroutine 122. Next, in step 228, the pointer 204 is initialized to point to the first entry 200 of the first data structure 103. Then, the system proceeds to step 230 to wait for frames for transmission to be made ready by another program executing within the MU 22. If such frames are available, the system proceeds step 232 to append the addresses stored in the entry of the first data structure 103 accessed by the pointer 204. Next, in step 234, a determination is made of whether the frames to be transmitted end the transmission process. If they do, a termination tag is appended in step 236 to the frames to be transmitted. This use of a termination tag subsequently allows the AP 24 with which association has been achieved and the various MUs 22 through which frames are sent to this AP 24 to free bandwidth that otherwise would be reserved for communications with the MU 22 originally requesting association. After the termination tag is thus appended, the frames are transmitted in step 238, with both the remote data transmission subroutine 124 and the remote access routine 98 then ending in step 240. On the other hand, a determination is made in step 234 that the frames to be transmitted are not the last transmission, the frames are transmitted in step 242.

After determining in step 230 that there are no frames ready for transmission, and alternately after transmitting frames in step 242, a determination is made in step 244 of whether frames addressed to the MU 22 have been received from the AP 24 with which association has been achieved. If such frames are not received, the system returns to step 230 to determine if frames are now ready for transmission. After such frames have been received, a first determination is made in step 246 of whether the frames have been received all right, indicating that the communication channel is working properly, and a second determination is made in step 248 of whether one of the intermediate MUs 22 transferring frames from the has appended the frames with a termination tag. Such a tag indicates that the MU 22 placing the tag needs additional bandwidth and will not accept further transmissions along the presently defined path between the MU 22 initially requesting association and the AP 24 with which association has been achieved.

If there is a problem with the present path, as determined by improperly received frames in step 246, or if a termination tag is found, as determined in step 248, the pointer 204 is incremented in step 250 to point to the next entry 200 in the first data structure 103. If this process results in finding a new data path, as determined in step 252, the system returns to step 230 so that the next frames to be transmitted will be transmitted along a data path determined by the addresses in the next entry 200. On the other hand, if a new data path is not found, as determined in step 252, because the pointer 204 has been moved past the last entry within the first data structure 103, the system returns in step 254 from the subroutine 124 to step 108 of the remote access routine 98, explained above in reference to FIG. 5, to determine if an AP 24 is in range and, if it is not in range, to build a new version of the first data structure 103.

Figure 12:
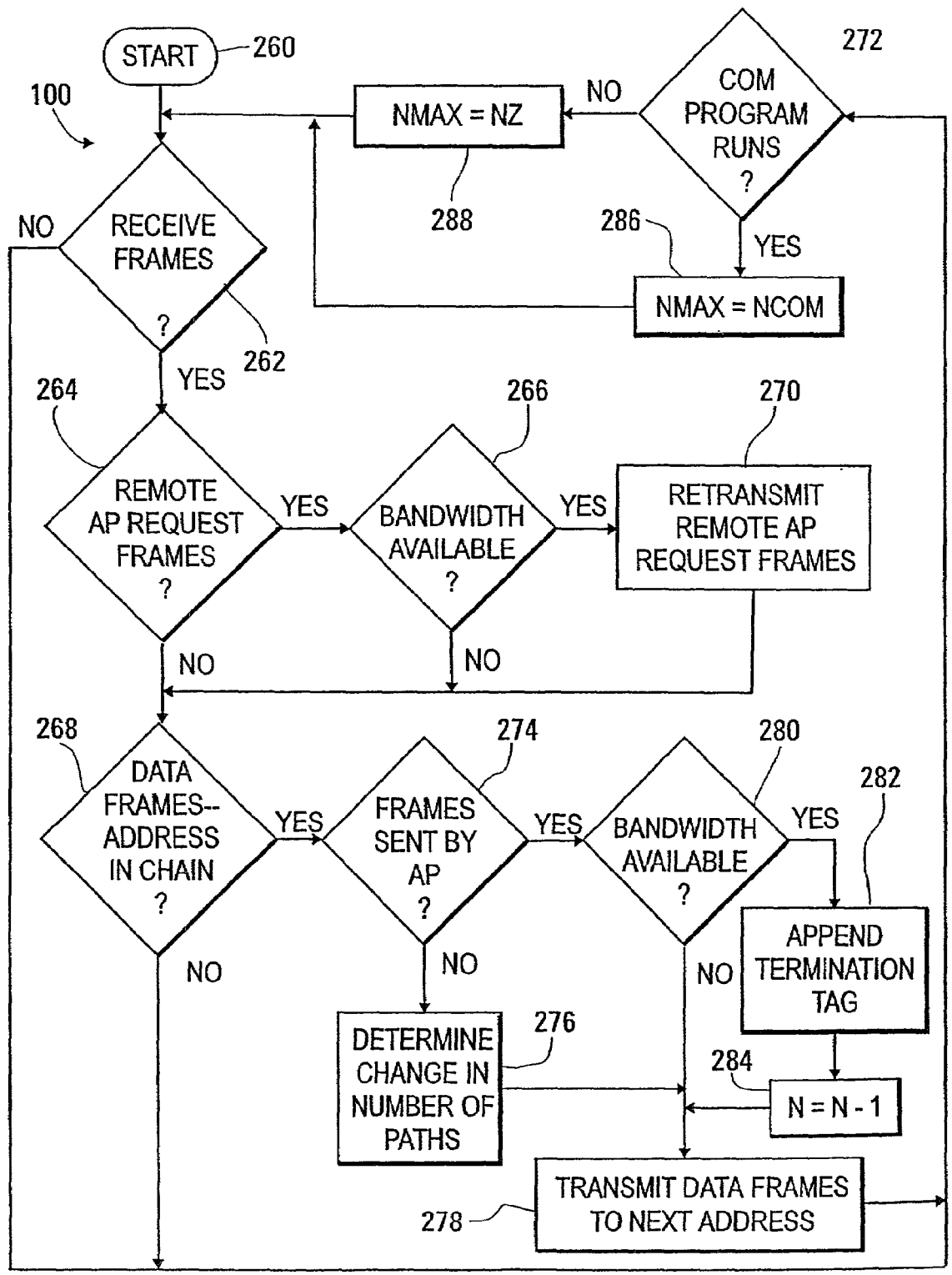
FIG. 12 is a flow chart of a retransmit routine executing within a mobile unit of FIG. 3.

FIG. 12 is a flow chart of processes occurring within the MU 22 during the execution of the retransmit routine 100 within the microprocessor 60. The retransmit routine 100 may execute as a background program during the execution of another routine or program, including the remote access routine 98.

After starting in step 260, the retransmit routine 100 waits to receive frames transmitted in a manner allowing them to be received through the radio device within the NIC card 92. After such frames are received, as determined in step 262, a determination is made in step 264 of whether the frames are remote AP request frames transmitted from another MU 22 in an attempt to associate with an AP 24 which is out of range. If such frames are detected, as determined in step 264, a determination is made in step 266 of whether sufficient bandwidth is available, i.e., of whether the number, N, of paths presently established in accordance with the invention for communications between one or more other MUs 22 and one or more APs 24, is less than a maximum allowable number, NMAX, of such paths. If the determination of step 266 is that another path cannot be accepted, the system proceeds to step 268 without further consideration of the frames which have been received. On the other hand, if the determination of step 266 indicates that another such path can be accepted, the system executes a subroutine 270, which will be described in detail in reference to FIG. 13, for retransmitting the remote AP request frames, before proceeding to step 268.

In step 268, a determination is made of whether the frames which have been received are data frames having a chain of addresses including the address of the MU 22 executing the retransmit routine 100. If these frames are not such data frames, the system proceeds to step 272 without performing any further processes related to these frames. If these frames are such data frames, it is known that these frames are being transmitted along a previously-established path in either direction between another MU 22 and a remote AP 24 with which the other MU 22 has associated in accordance with the invention.

The number of paths using the MU executing the retransmit routine 100 must be tracked in order to determine whether there is sufficient bandwidth to establish a new path or to maintain the present number of such paths. An increase in the number of such paths is considered to have occurred when an additional MU 22 initiating the transmission of such data frames sends such frames for the first time. The transmission of the remote AP request frames is not considered, since many such transmissions may occur for each of such transmissions resulting in an association between an MU 22 and a remote AP 24. Also, the transmission of data frames from the AP 24 is not considered, since only the first such transmission received at the MU 22 initiating the process will form such a path. Therefore, if it is determined in step 274 that the frames were not sent by an AP 274 (i.e. that the transmission must have been originated by the MU 22), a subroutine 276 is executed to determine if a change has occurred in the number of paths. This subroutine 276 will be explained in detail in reference to FIG. 14. After the execution of this subroutine 276, the system proceeds to step 278, in which the data frames are transmitted to the next MAP address in the chain of addresses.

On the other hand, if a determination is made in step 274 that the frames were sent by the AP 24, it is known that the frames are directed to the MU 22 initiating the process of associating with a remote AP 24, and that this MU 22 can choose another path if necessary. Therefore, if it is determined in step 274 that the frames have been sent by an AP 24, a determination is made in step 280 of whether sufficient bandwidth is available to maintain the present number of paths. This determination is based on whether the number of such paths, N, is greater than the maximum number, NMAX, of such paths allowed. If it is determined that sufficient bandwidth is available, the data frames are transmitted to the next address in step 278. If it is determined that such bandwidth is not available, a termination tag is appended to the data frames in step 282, the number of paths, N is reduced by one in step 284, and the data frames are transmitted to the next address in step 278.

In accordance with a preferred version of the invention, the MU 22 allows its incorporation in a greater number of paths when a communications program, which is expected to place bandwidth requirements of it own on the capabilities of the MU 22, is not executing within the MU 22 than when such a communications program is executing therein. Preferably, the maximum numbers of such paths are set by the system user through graphical user interface with the dialog box 160, as explained above in reference to FIG. 7. Thus, after the data frames are transmitted in step 278, the system proceeds to step 272, in which a determination is made of whether such a communication program is running, or executing within the processor of the MU 22. If such a communications program is running, NMAX, the maximum number of paths to be provided, is set in step 286 to NCOM, a value stored for setting such a number with a communications program running. If such a communications program is not running, NMAX is set in step 288 to NZ, a value stored for setting such a number with a communications program not running.

Figure 13:
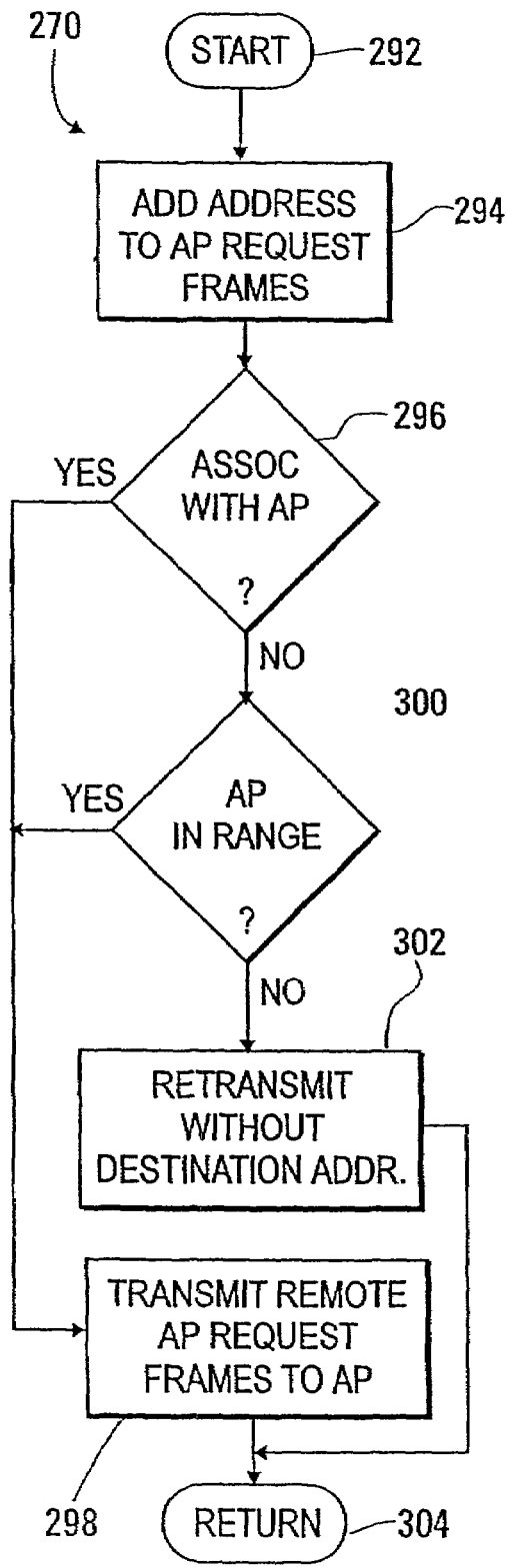
FIG. 13 is a flow chart of a subroutine, within the retransmit routine of FIG. 12, for retransmitting remote AP request frames initially transmitted by the remote mobile unit of FIG. 3.

FIG. 13 is a flow chart of processes occurring during the execution of a subroutine 270 for retransmitting remote AP request frames initially transmitted from another MU 22. After the subroutine starts in step 292, the MAC address of the MP 22 executing the routine 100, is added in step 294 to the remote AP request frames determined to have been received in step 270, making the frames ready for retransmission.

During execution of the subroutine 270, the MU 22 in which the retransmit routine 100 is executing may already be associated with an AP 24, or it may otherwise be in or out of range of an AP 24. Therefore, in step 296, a determination is made of whether this MU 22 is associated with an AP 24. If this MU 22 is already associated with an AP 24, the remote AP request frames are transmitted directly to this AP 24 in step 298. If the MU 22 is not associated with an AP 24, a subroutine 300 is executed to determine whether an AP 24 is in range of the MP 22 executing the retransmit routine 100. This subroutine 300 is similar to the subroutine 108 described above in reference to FIG. 6. If the subroutine 300 determines that an AP 24 is within range, the remote AP request frames are also transmitted directly to this AP 24 in step 278. On the other hand, if the subroutine 276 determines that there is no AP 24 within range, the remote AP request frames are retransmitted in step 302 without an identified destination, hopefully to be transmitted to a remote AP 24 from another MU 22. After the frames are transmitted in step 278 or in step 302, the system returns from the subroutine 270 in step 304.

Figure 14:
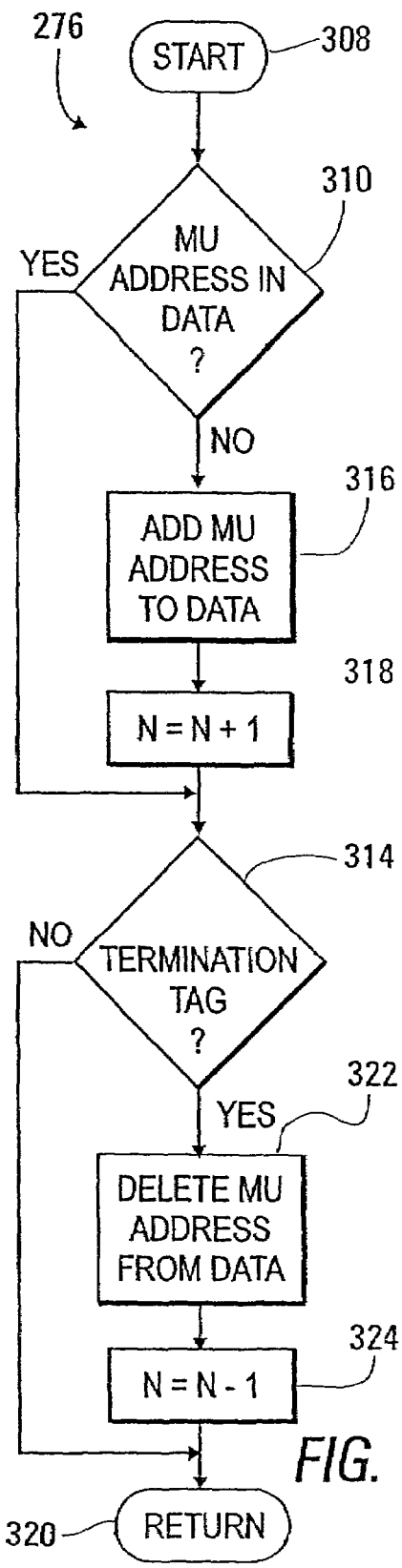
FIG. 14 is a flow chart of a subroutine, within the retransmit routine of FIG. 12, for determining whether data frames that have been received indicate that the number of paths using a mobile unit of FIG. 3 has changed.

FIG. 14 is a flow chart showing processes occurring during execution of a subroutine 276 for determining whether data frames which have been received by the MU 22 indicate that the number, N, of paths using the MU 22 should be changed. This subroutine 276 executes within the retransmit routine 100, explained above in reference to FIG. 12, following a determination in step 274 that data frames have not been sent by an AP 24. Such a determination means that transmission of the frames must have originated with the MU 22 associating with a remote AP 24.

After the subroutine 276 starts in step 308, a determination is made in step 310 of whether the MAC address of the MU 22 originating the transmission of the data frames determined to have been received in step 268 is stored within a second data structure 312 in the RAM memory 70 (shown in FIG. 4). This data structure holds the MAC addresses of each MU 22 associating with a remote AP 24 through a path including the MU 22 in which the subroutine 276 is executed. If the MU address of this MU 22 originating the transmission is already stored in the second data structure 312, it is known that the path of the transmission has already been accounted for, so the system proceeds directly to step 314. If the MAC address of the MU 22 originating the transmission is not already stored in the second data structure 312, this address is added to the data within the second data structure 312 in step 316, and the number, N, reflecting the number of paths being serviced by the MU 22 in which the subroutine 276 is executed is increased by one in step 318.

When the MU 22 originating the transmission of data frames is ready to terminate the transmission of data to the AP 24, the MU 22 attaches a termination tag to the data frames being transmitted, in order to free band width within the various devices in the path, such as the MU 22 executing the subroutine 276. Thus, in step 314, a determination is made of whether the data frames include a termination tag. If they do not include a termination tag, the system proceeds to return from the subroutine 276 in step 320. If these data frames include a termination tag, the MAC address of the MU 22 originating the transmission is removed from the second data structure 312 in step 322, and the number N is reduced by one in step 324, before returning from the subroutine 276 in step 320.

Figure 15:
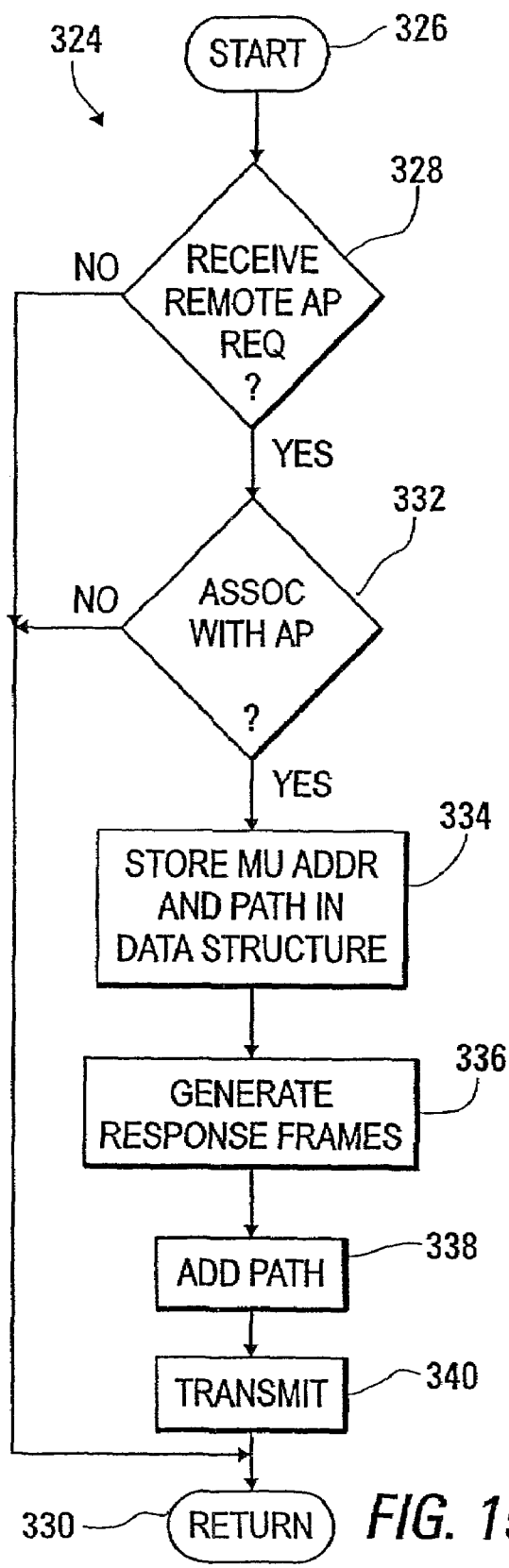
FIG. 15 is a flow chart of a subroutine executing within an access point of FIG. 3 to provide a response to receiving remote access request frames.
Figure 16:
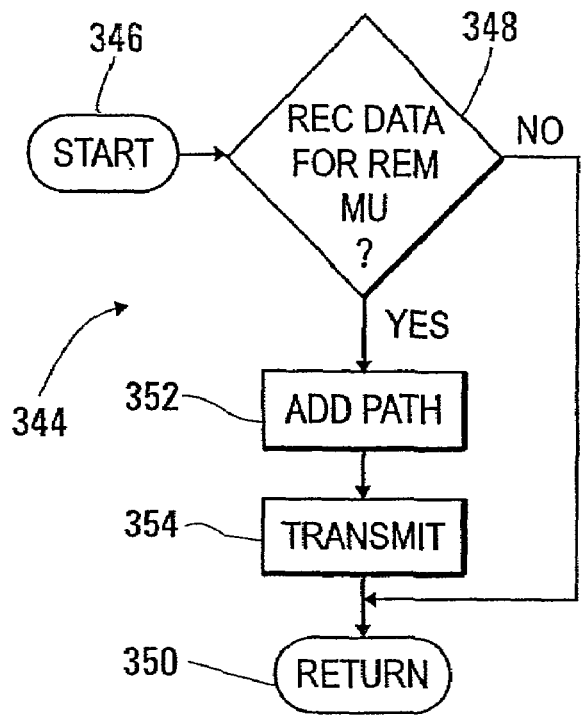
FIG. 16 is a flow chart of a subroutine executing within the access point of FIG. 3 to provide a response for receiving data frames addressed to a mobile unit of FIG. 3 to which remote association has been granted.
Figure 17:
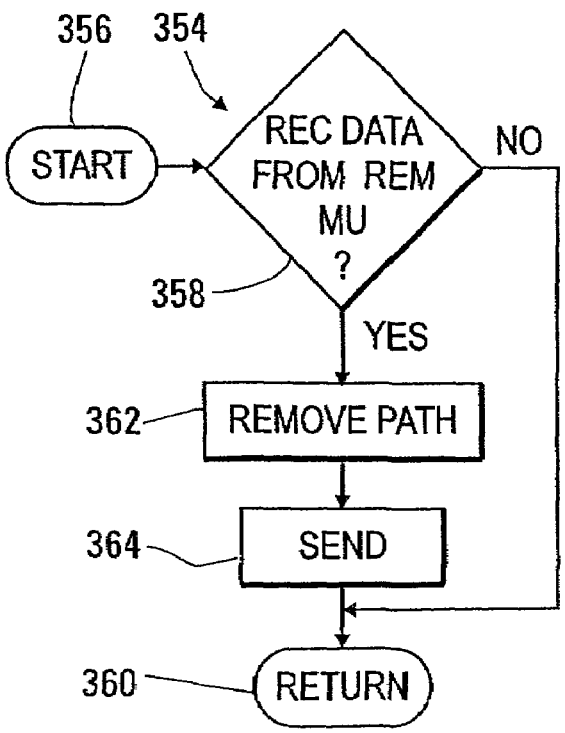
FIG. 17 is a flow chart of a subroutine executing within the access point of FIG. 3 to provide a response for receiving data frames sent by a mobile unit of FIG. 3 to which remote association has been granted.

Operation of the AP 24 in accordance with the invention will now be discussed, with particular references being made to FIGS. 15–17. In general, operation of the AP 24 is conventional, with some modifications being made to accommodate the use of a path through multiple MUs 22 in order to reach the MU 30 originating the remote access request frames. In the example of FIGS. 15–17, subroutines providing for particular operations associated with the invention are shown, and are assumed to be part of one or more routines executing in a microprocessor within the AP 24 to provide conventional services.

FIG. 15 is a flow chart of processes occurring within the AP 24 during execution of a subroutine 324 providing for a response to receiving remote access request frames. The AP 24 is understood to include a computing system having a microprocessor, information storage, etc., configured generally as described above in reference to FIG. 4, or configured as well known to those skilled in the relevant art.

After this subroutine 324 is started in step 326, a determination is made in step 328 of whether remote access request frames have been received. If they have not been received, the system returns to another routine in step 330 to check for other conditions, with the subroutine 324 being repeatedly called on a periodic basis. If a determination is made in step 328 that remote access request frames have been received, the system proceeds to step 332 in which a determination is made of whether to accept association with the AP 30 originating the remote access request frames. The processes used in step 332 may be conventional, such as allowing access only to an MU 30 having a MAC address stored within a database 52 accessible through the LAN 50, as discussed above in reference to FIG. 3. Alternately, for example, access may be provided to any MU 30 properly causing the presentation of remote access request frames. If the association is denied, the system returns from the subroutine 324 in step 330.

If a determination is made in step 332 to approve the association, the system proceeds to step 334, in which the MAC address of the MU 30 originating is recorded in a data structure stored by the AP 24, together with the MAC addresses of other MUs 22 forming a path between the MU 30 and the AP 24. Then, in step 336, remote access response frames are generated, responding to the remote access request frames. In step 336, the MAC addresses of the other MUs 22 in the path are added to the remote access response frames, being ordered so that t the remote access response frames will be transmitted along the path, from one device to another, in the direction opposite that through which the remote access request frames took to reach the AP 24. Then, in step 340 the remote access response frames are transmitted by radio, to proceed from one device to another along the path. After this transmission is complete, the system returns from the subroutine 324 in step 330.

FIG. 16 is a flow chart of processes occurring within the AP 24 during execution of a subroutine 344 providing for a response to data frames addressed to an MU 30 to which a remote association has been granted by the AP 24. After this subroutine 344 starts in step 346, a determination is made in step 348 of whether such data frames have been received from the LAN 50 (shown in FIG. 3). If such data frames have not been received, the system returns from this subroutine 344 in step 350, with the subroutine 344 being executed periodically. Preferably, this determination is made by determining whether the MAC address of an MU identified as a destination in data frames received from the LAN 50 has been stored in the data structure of the AP 24 in step 334, as described above in reference to FIG. 15. If it has been stored in this way, the path, read from this data structure, as recorded therein in step 334, is added in step 352 the data frames received from the LAN 50, with the addresses being ordered so that the data frames will be transmitted from the AP 24 to the MU 30. Next, these data frames are transmitted by radio in step 354, with the system then returning from the subroutine 344 in step 350.

FIG. 17 is a flow chart of processes occurring within the AP 24 during execution of a subroutine 354 for providing a response to data frames sent by an MU 30 to which a remote association has been granted by the AP 24. After this subroutine 354 is started in step 356, a determination is made in step 358 of whether such frames have been received. If such frames have not been received, the system returns from the subroutine 354 in step 360, with the subroutine 354 being repeatedly executed on a periodic basis. Such frames may be recognized by the presence of a path including a number of MUs 22 within the data frames, or by comparing the MAC address of the MU originating the transmission with the MAC addresses recorded in a database in step 334 of the subroutine 324, as described above in reference to FIG. 17. If it is determined that data frames from an MU 30 remotely associated with the AP 24, the addresses of MUs 22 forming the path are deleted from the data frames in step 362, and the data frames are sent along the LAN 50 in step 364.

Preferably, the AP 24 is part of an ESS, as defined in the IEEE 802.11 architecture, operating with adjacent APs to provide services including disassociating with an MU, such as the MU 30 having received a remote association, when the MU is found to have associated with an adjacent AP. Disassociation would include deleting the MAC address of the MU 30 and associated path from the data structure.

While the invention has been described in its preferred version or embodiment with some degree of particularity, it is understood that this description has been given by way of example, and that many changes may be made without departing from the spirit and scope of the invention.

What is claimed is:

1. A method for providing wireless data communication between an access point connected to a communication network and a remote mobile unit, out of range of direct wireless communication with said access point, wherein said method comprises:
   a) transmitting a remote access request by radio from said remote mobile unit;
   b) generating path information describing said remote access request and a first plurality of paths from said remote mobile unit, wherein said first plurality of paths include a plurality of intermediate mobile units, in response to said remote access request;
   c) transmitting said path information by radio;
   d) receiving path information describing said remote access request and a second plurality of paths, within said first plurality of paths, in said access point, wherein a portion of said path information is transmitted by radio to said access point along each path in said second plurality of paths;
   e) transmitting a remote access response along each path in said second plurality of paths from said access point to said remote mobile unit;
   f) receiving said remote access response in said remote mobile unit, transmitted along each path within a third plurality of paths, within said second plurality of paths; and
   g) selecting a selected path within said second plurality of paths in said remote mobile unit
   h) sending data along said selected path between said remote mobile unit and said access point, wherein each said intermediate mobile unit in said selected path receives wirelessly transmitted data along said selected path in a first direction, and wherein each said intermediate mobile unit in said selected path transmits said data to continue in said first direction along said selected path.

2. The method of claim 1, wherein step b) comprises:
   receiving said remote access request in said plurality of intermediate mobile units; and
   adding, in each intermediate mobile unit in said plurality of intermediate mobile units, to said remote access request, an address identifying said mobile unit as a part of a path to said remote mobile unit.

3. The method of claim 2, wherein said plurality of intermediate mobile units includes:
   a first plurality of intermediate mobile units directly receiving the remote access request from the remote mobile unit; and
   a second plurality of intermediate mobile units receiving said remote access request transmitted by an intermediate mobile unit within said first plurality of intermediate mobile units.

4. The method of claim 1, wherein said plurality of intermediate mobile units includes:
   a first plurality of intermediate mobile units directly receiving the remote access request from the remote mobile unit; and
   a second plurality of intermediate mobile units receiving said remote access request transmitted by an intermediate mobile unit within said first plurality of intermediate mobile units.

5. The method of claim 1, wherein
   said path information received by said access point in step d) for each path in said second plurality of paths includes address information identifying each of said intermediate mobile units in said path, and
   said remote access information transmitted along each path in said second plurality of paths in step e) includes address information identifying each of said intermediate mobile units in said path.

6. The method of claim 1, wherein said path selected in step g) is a path along which said remote access response first received by said remote mobile unit has been transmitted.

7. The method of claim 1, wherein said path selected in step g) is a path including a smallest number of intermediate mobile units.

8. The method of claim 1, wherein
   certain intermediate mobile units in said plurality of intermediate mobile units are associated with said access point, and
   each of said intermediate mobile units in said plurality of intermediate units associated with said access point transmits said path information by radio directly to said access point.

9. The method of claim 1, wherein step a) is preceded by determining that said remote mobile unit is out of range of direct wireless communication with said access point.

10. The method of claim 1, wherein
    said remote mobile unit stores information describing at least one path within said third plurality of paths in addition to information describing said selected path;
    said remote mobile unit connects to said access point through one of said at least one path during step h) in response to a determination that transmitted data has not been received correctly.

11. A system for providing a wireless connection to a communication network in a remote location, wherein said system comprises:
    a remote mobile unit at said remote location, wherein said remote mobile unit includes a radio transmitter and receiver and a microprocessor programmed to transmit a remote access request by radio in response to determining that an access point connected to said communication network is out of range for direct radio communication with said remote mobile unit, to receive a remote access response transmitted along each path within a plurality of paths, to select a selected path from said plurality of paths, and to transmit and receive data along said selected path to said access point;

a plurality of intermediate mobile units, wherein each mobile unit in said plurality of mobile units includes a radio transmitter and receiver and a microprocessor programmed to receive said remote access request, to add address information identifying said mobile unit to said remote access request, forming path information describing a path between said remote mobile unit and said intermediate mobile unit, to transmit said path information by radio, and to receive and retransmit data including address information identifying said intermediate mobile unit when said data transmitted along a path between said remote mobile unit and an access point; and an access point connected to said communication network, wherein said access point includes a radio transmitter and receiver and a microprocessor programmed to receive said path information transmitted along each path within a plurality of paths, to transmit a remote access response along each path within said plurality of paths, and to direct communications between said communication network and said remote mobile unit over said selected path.

12. The system of claim 11, wherein said plurality of intermediate mobile units includes:

a first plurality of intermediate mobile units directly receiving the remote access request from the remote mobile unit; and a second plurality of intermediate mobile units receiving said remote access request transmitted by an intermediate mobile unit within said first plurality of intermediate mobile units.

13. The system of claim 11, wherein certain intermediate mobile units in said plurality of intermediate mobile units are associated with said access point, and each of said intermediate mobile units in said plurality of intermediate units associated with said access point transmits said path information by radio directly to said access point.

14. The system of claim 11, wherein said path selected in step g) is a path along which said remote access response first received by said remote mobile unit has been transmitted.

15. The system of claim 11, wherein said path selected in step g) is a path including a smallest number of intermediate mobile units.

16. The system of claim 11, wherein said remote mobile unit stores information describing at least one path within said third plurality of paths in addition to information describing said selected path;

said remote mobile unit connects to said access point through one of said at least one path during step h) in response to a determination that transmitted data has not been received correctly.

\* \* \* \* \*